United States Patent
Murakami et al.

(10) Patent No.: US 10,734,655 B2
(45) Date of Patent: Aug. 4, 2020

(54) ELECTRIC STORAGE DEVICE

(71) Applicants: GS Yuasa International Ltd., Kyoto-shi (JP); HONDA MOTOR CO., LTD., Tokyo (JP)

(72) Inventors: Satoshi Murakami, Kyoto (JP); Masamitsu Tononishi, Kyoto (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 985 days.

(21) Appl. No.: 14/398,954

(22) PCT Filed: Mar. 13, 2013

(86) PCT No.: PCT/JP2013/056976
§ 371 (c)(1),
(2) Date: Nov. 4, 2014

(87) PCT Pub. No.: WO2013/168466
PCT Pub. Date: Nov. 14, 2013

(65) Prior Publication Data
US 2015/0118569 A1    Apr. 30, 2015

(30) Foreign Application Priority Data
May 10, 2012    (JP) ................. 2012-108697

(51) Int. Cl.
*H01M 4/70* (2006.01)
*H01M 2/26* (2006.01)
(Continued)

(52) U.S. Cl.
CPC .............. *H01M 4/70* (2013.01); *H01G 11/72* (2013.01); *H01G 11/76* (2013.01); *H01G 11/82* (2013.01);
(Continued)

(58) Field of Classification Search
CPC .......... H01M 4/70; H01M 4/661; H01M 4/13; H01M 2/26; H01M 2/22; H01M 2/04;
(Continued)

(56) References Cited

U.S. PATENT DOCUMENTS

2004/0028999 A1    2/2004    Richard et al.
2005/0118501 A1    6/2005    Hashimoto et al.
(Continued)

FOREIGN PATENT DOCUMENTS

JP    10-50556 A    2/1998
JP    10-106536 A    4/1998
(Continued)

OTHER PUBLICATIONS

English Translation of JP 2003197174.*
(Continued)

*Primary Examiner* — Milton I Cano
*Assistant Examiner* — Kiran Akhtar
(74) *Attorney, Agent, or Firm* — McGinn I. P. Law Group, PLLC

(57) ABSTRACT

An electric storage device according to the present invention includes: an electrode assembly including positive and negative electrode plates that are insulated from each other, at least one of the electrode plates having an active material layer formed part and an active material layer non-formed part; positive and negative current collectors; and a metal material abutted against the active material layer non-formed part, wherein the metal material includes a curled part in which an edge of the metal material is curved in a direction away from the active material layer non-formed part, and the active material layer non-formed part, each of the current collectors, and the metal material are integrally coupled.

18 Claims, 12 Drawing Sheets

(51) Int. Cl.
| | |
|---|---|
| *H01M 4/66* | (2006.01) |
| *H01M 10/0525* | (2010.01) |
| *H01G 11/82* | (2013.01) |
| *H01G 11/76* | (2013.01) |
| *H01G 11/72* | (2013.01) |
| *H01M 4/13* | (2010.01) |
| *H01M 2/04* | (2006.01) |
| *H01M 2/22* | (2006.01) |
| *H01M 10/058* | (2010.01) |

(52) U.S. Cl.
CPC ............ *H01M 2/04* (2013.01); *H01M 2/22* (2013.01); *H01M 2/26* (2013.01); *H01M 2/263* (2013.01); *H01M 4/13* (2013.01); *H01M 4/661* (2013.01); *H01M 10/058* (2013.01); *H01M 10/0525* (2013.01); *Y02E 60/13* (2013.01)

(58) Field of Classification Search
CPC . H01M 10/058; H01M 10/0525; H01M 2/263
See application file for complete search history.

(56) References Cited

U.S. PATENT DOCUMENTS

| | | | |
|---|---|---|---|
| 2007/0117009 A1* | 5/2007 | Yamauchi | H01M 2/263 429/160 |
| 2009/0004562 A1 | 1/2009 | Inagaki et al. | |
| 2009/0064487 A1 | 3/2009 | Hashimoto et al. | |
| 2009/0104518 A1* | 4/2009 | Nedelec | H01M 2/263 429/161 |
| 2009/0305134 A1 | 12/2009 | Ryu | |
| 2010/0203371 A1 | 8/2010 | Nagai et al. | |
| 2011/0223454 A1 | 9/2011 | Urano et al. | |
| 2012/0070720 A1 | 3/2012 | Aizawa et al. | |
| 2012/0258342 A1* | 10/2012 | Tstsumi | H01G 11/66 429/94 |
| 2013/0157094 A1 | 6/2013 | Saimaru et al. | |

FOREIGN PATENT DOCUMENTS

| | | | | |
|---|---|---|---|---|
| JP | 11-265703 A | | 9/1999 | |
| JP | 2003-197174 A | | 7/2003 | |
| JP | 2003197174 | * | 7/2003 | ............. H01M 2/26 |
| JP | 2003-282044 A | | 10/2003 | |
| JP | 2004-071199 A | | 3/2004 | |
| JP | 2004-207089 A | | 7/2004 | |
| JP | 2005-142026 A | | 6/2005 | |
| JP | 2005-183359 A | | 7/2005 | |
| JP | 2005-528741 A | | 9/2005 | |
| JP | 2007-149353 A | | 6/2007 | |
| JP | 2008-27893 A | | 2/2008 | |
| JP | 2008-516383 A | | 5/2008 | |
| JP | 2009-026705 A | | 2/2009 | |
| JP | 2009-032670 A | | 2/2009 | |
| JP | 2009-087727 A | | 4/2009 | |
| JP | 2009-105074 A | | 5/2009 | |
| JP | 2010-080393 A | | 4/2010 | |
| JP | 2010-272324 A | | 12/2010 | |
| JP | 2011-014276 A | | 1/2011 | |
| JP | 2011-049065 A | | 3/2011 | |
| JP | 2011-165436 | * | 8/2011 | ............. H01M 2/26 |
| JP | 2011-165436 A | | 8/2011 | |
| JP | 2011-192517 A | | 9/2011 | |
| JP | 2012-69268 A | | 4/2012 | |
| JP | 2012-178235 A | | 9/2012 | |
| WO | WO 2012/023392 | * | 2/2012 | ............. H01M 2/26 |
| WO | WO 2012/023392 A1 | | 2/2012 | |
| WO | WO 2012/029336 A1 | | 3/2012 | |

OTHER PUBLICATIONS

English Translation of JP2011-165436.*
International Search Report (ISR) (PCT Form PCT/ISA/210), in PCT/JP2013/056976, dated May 14, 2013 (English Translation).
English Translation of International Preliminary Report on Patentability in PCT No. PCT/JP2013/056976 dated Nov. 11, 2014.

* cited by examiner b - b a - a

ELECTRIC STORAGE DEVICE

FIELD

The present invention relates to an electric storage device such as a non-aqueous electrolyte secondary battery cell. Specifically, the present invention relates to a coupling structure of an electrode assembly with a current collector. An electric storage device is a generic term for primary battery cells, secondary battery cells, electric double layer capacitors, and the like.

BACKGROUND

As an electric storage device of this type, one disclosed in Patent Literature 1 is known. Patent Literature 1 discloses an electrode assembly that is formed by winding a positive electrode plate in the form of a strip foil and a negative electrode plate in the form of a strip foil in an insulated state, with a pair of separators interposed therebetween, into a spiral shape, and flattening them, so as to have an elongated circular cross section (see FIG. 8 of Patent Literature 1, for example). An end part of each electrode of the electrode assembly is a non-coated part that is not coated with an active material, and projects from the end of the other electrode. The non-coated part is distributed at a plurality of (five) portions, and layers in the respective portions are gathered to form layer bundles. A current collector is a metal member having a plurality of grooves to receive the respective layer bundles. The layer bundles and the current collector are welded together by laser welding (see FIG. 9 of Patent Literature 1, for example).

In Patent Literature 1, the electrode assembly is depicted so that the spiral axis extends in the up-down direction. However, Patent Literature 1 fails to describe how the electrode assembly and the current collector are coupled with each other. Further, as shown in Patent Literature 2, a non-aqueous electrolyte secondary battery cell in which an electrode assembly is arranged so that its spiral axis extends in the left-right direction has been developed.

It can be understood from Patent Literature 2 that a pair of bifurcated current collectors having branched distal ends are arranged respectively at the left and right ends of the electrode assembly. However, Patent Literature 2 merely discloses an electrode assembly to an extent such that the arrangement thereof is suggested by an imaginary line. Patent Literature 2 fails to disclose how a large number of positive and negative electrode plates projecting laterally are coupled with the current collectors.

CITATION LIST

Patent Literature

Patent Literature 1: JP H 10-106536 A
Patent Literature 2: JP 2010-272324 A

SUMMARY

Technical Problem

It is an object of the present invention to provide an electric storage device suitable for practical use, by developing a rational coupling structure of positive and negative electrode plates of an electrode assembly respectively with current collectors.

Solution to Problem

According to an aspect of the present invention, an electric storage device includes: an electrode assembly including positive and negative electrode plates that are insulated from each other, at least one of the electrode plates having an active material layer formed part and an active material layer non-formed part; positive and negative current collectors; and a metal material abutted against the active material layer non-formed part, wherein the metal material includes a curled part in which an edge of the metal material is curved in a direction away from the active material layer non-formed part, and the active material layer non-formed part, each of the current collectors, and the metal material are integrally coupled.

DESCRIPTION OF EMBODIMENTS

Figure 1:
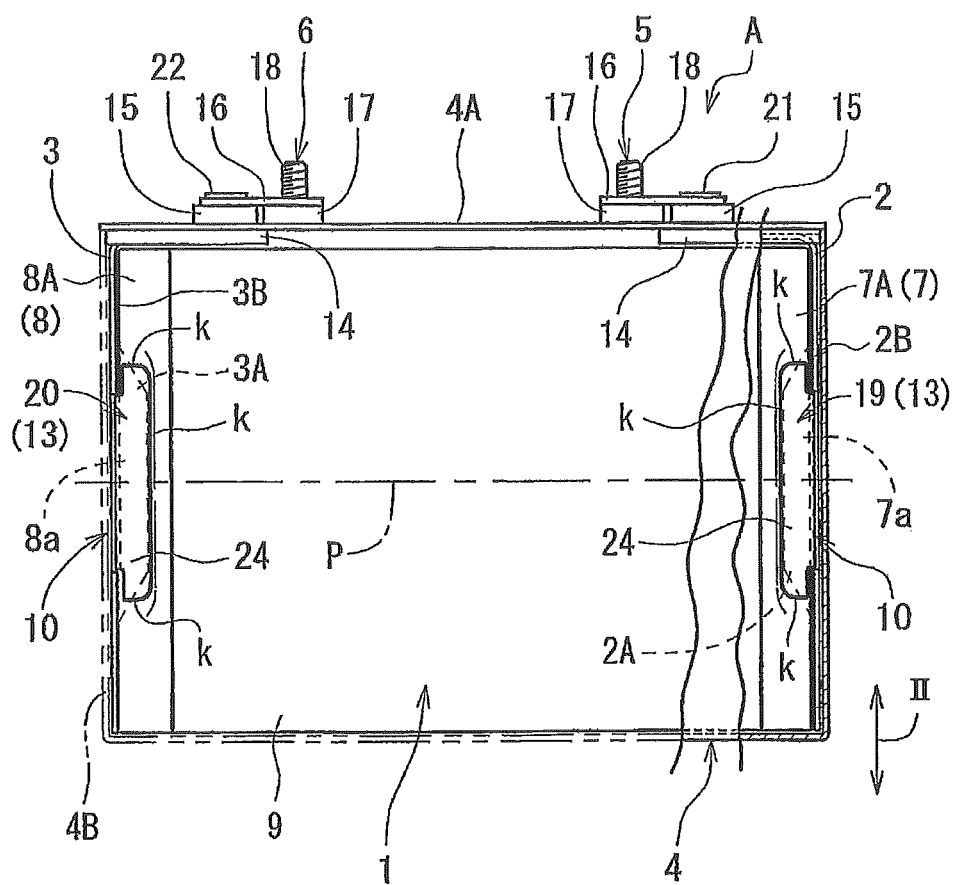
FIG. 1 is a partially cutout front view showing a lithium-ion secondary battery cell.

Hereinafter, an embodiment of an electric storage device according to the present invention is described with reference to the drawings in the case where it is applied to a lithium-ion secondary battery cell that typifies a non-aqueous electrolyte secondary battery cell. First of all, an outline of a lithium-ion secondary battery cell according to the present embodiment is described.

The lithium-ion secondary battery cell according to this embodiment includes: an electrode assembly including positive and negative electrode plates that are insulated from each other, at least one of the electrode plates having an active material layer formed part and an active material layer non-formed part; positive and negative current collectors; and a metal material abutted against the active material layer non-formed part, wherein the metal material includes a curled part in which an edge of the metal material is curved in a direction away from the active material layer non-formed part, and the active material layer non-formed part, each of the current collectors, and the metal material are integrally coupled.

According to this lithium-ion secondary battery cell, the active material layer non-formed part is abutted against a curved surface, not an edge, of the metal material. Thus, even when the active material layer non-formed part is rubbed with the metal material due to vibration applied from the outside, the occurrence of breakage or tear in the active material layer non-formed part is avoided.

According to one aspect, the lithium-ion secondary battery cell of this embodiment may have a configuration in which the curled part is formed along an edge on the active material layer formed part side of the metal material and edges on both sides thereof.

According to this lithium-ion secondary battery cell, the curled part is formed along the edge on the active material layer formed part side of the metal material and the edges on both sides thereof. The metal material may possibly cause edge abrasion with an electrode plate along edges on three sides in directions, as seen from the coupling portion with a current collector, in which the electrode plate exists, that is, the edge on the active material layer formed part side and the edges on both sides thereof. That is, the curled part is provided only in a portion that is rubbed against the electrode plate. Therefore, when vibration is applied from the outside, the metal material is configured to rub the electrode plate while the curled part that is a curved surface is abutted against the electrode plate. Thus, it is possible to provide a more rational electric storage device capable of exerting the aforementioned functional effect of avoiding the occurrence of breakage or tear in the active material layer non-formed part by using the curled part that is the minimum necessary.

In this case, it is preferable that the edge on the active material layer formed part side be connected to the edges on both sides thereof so as to form an arcuate shape, and the curled part be formed continuously over the edge on the active material layer formed part side and the edges on both sides thereof.

According to this lithium-ion secondary battery cell, even in the case where the edge abrasion of the electrode plates occurs with respect to the edge on the active material layer formed part side of the metal material and the edges on both sides thereof, the occurrence of breakage or tear in the active material layer non-formed part is avoided.

According to another aspect, the lithium-ion secondary battery cell of this embodiment may have a configuration in which the active material layer non-formed part, each of the current collectors, and the metal material are integrally coupled by pressure welding, and a portion of the metal material to which a pressure is applied is displaced toward the active material layer non-formed part side from its periphery.

According to this lithium-ion secondary battery cell, since the portion of the metal material to which a pressure is applied has been already displaced toward the active material layer non-formed part side from its periphery before the application of a pressure, the pressure load to be applied thereto can be used for compressing the active material layer non-formed part. This allows the metal material to extend along the electrode plate more closely.

According to still another aspect, the lithium-ion secondary battery cell of this embodiment may have a configuration in which the metal material includes a projecting ridge elongated in one direction and projecting in a direction away from the active material layer non-formed part.

According to this lithium-ion secondary battery cell, the metal material has a ribbed shape, so that the mechanical strength and rigidity of the metal material are improved. This allows the metal material to function as a frame that supports the active material layer non-formed part.

In this case, it is preferable that the curled part be formed along the edge on the active material layer formed part side of the metal material and an edge on the opposite side thereof, and the projecting ridge connect the curled part on the active material layer formed part side and the curled part on the opposite side.

Further, it is preferable that a plurality of projecting ridges described above be aligned at intervals from each other, the active material layer non-formed part, each of the current collectors, and the metal material be integrally coupled by pressure welding, and a partial region of the metal material that is defined by the projecting ridges be a portion to which a pressure is applied, the portion being displaced toward the active material layer non-formed part side from its periphery.

According to still another aspect, the lithium-ion secondary battery cell of this embodiment may have a configuration in which the metal material has a bifurcated shape including a narrow plate part provided between the active material layer non-formed part and each of the current collectors, and an external plate part sandwiching the active material layer non-formed part with the narrow plate part.

According to this lithium-ion secondary battery cell, it is possible to provide an electric storage device that is widely applicable, for example, to large secondary battery cells.

In this case, it is preferable that the metal material include a connecting plate part connecting the narrow plate part to the external plate part, and the curled part be formed over the entire outer circumference or substantially the entire circumference except the portion connected to the connecting plate part, in each of the narrow plate part and the external plate part.

According to this lithium-ion secondary battery cell, in a state where a large number of active material layer non-formed parts are provided between a metal material and a current collector, the active material layer non-formed parts, the current collector, and the metal material are coupled with each other by pressure welding.

Subsequently, the lithium-ion secondary battery cell according to this embodiment will be described. Basically, only one (positive electrode side) of a pair of current collectors 2 and 3, and its structure are described herein. A corresponding reference number is given to the other (negative electrode side) of them, and the description thereof is deemed to have been given.

Embodiment 1

Figure 2:
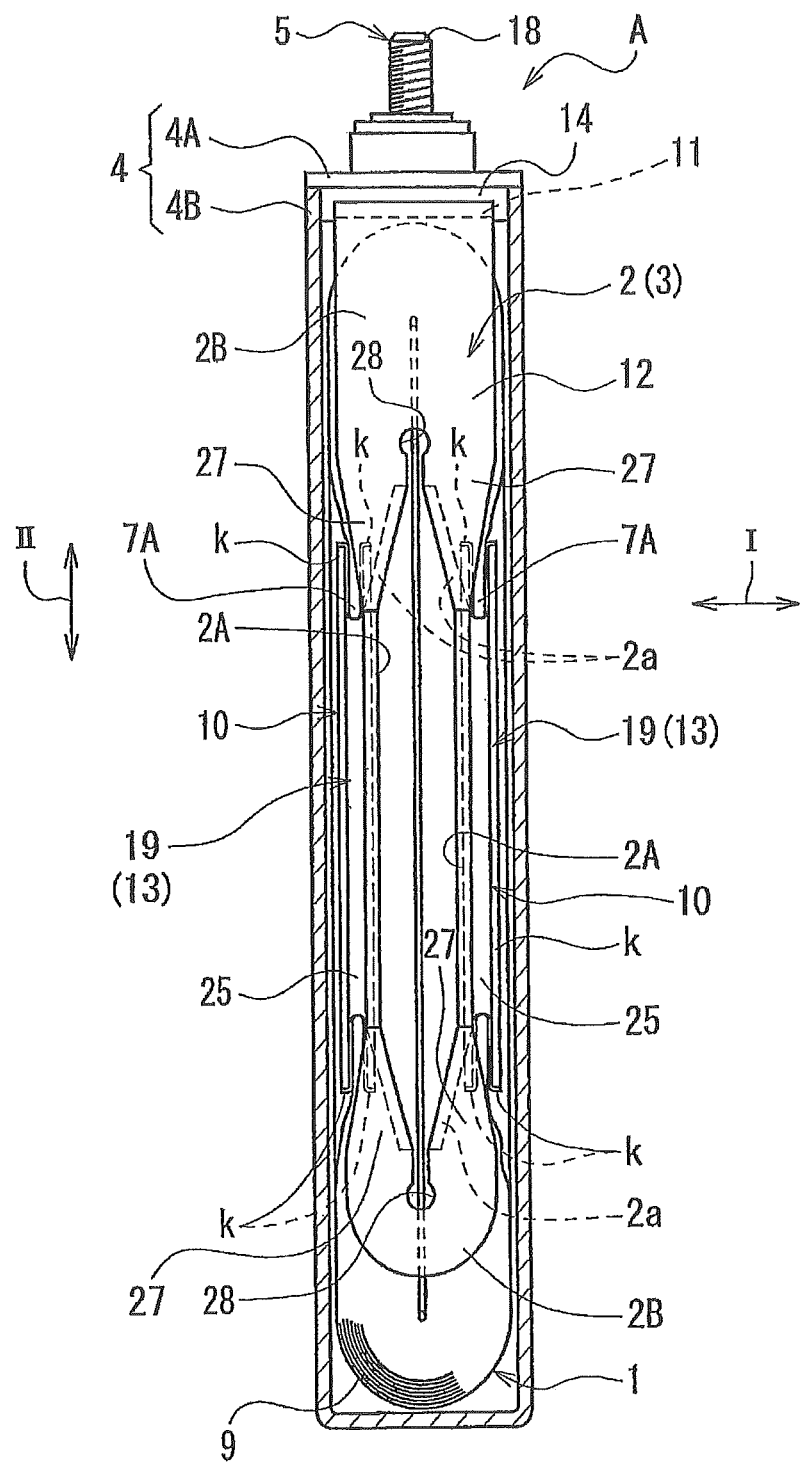
FIG. 2 is a side view showing a structure of a main part of the lithium-ion secondary battery cell.

FIG. 1 and FIG. 2 show a lithium-ion secondary battery cell A according to Embodiment 1. The lithium-ion secondary battery cell A is a flattened vertical rectangular battery cell in which an electrode assembly 1, a pair of current collectors 2 and 3, and an electrolyte (not shown) are housed in a hard plate battery case 4 made of aluminum alloy, stainless steel alloy, or the like. On a top plate 4A of the battery case 4, the positive and negative external terminals 5 and 6 that are electrically connected respectively to the current collectors 2 and 3 are provided. The battery case 4 has a structure in which a case body 4B having an open-top box shape and the top plate 4A are integrated together by welding such as laser welding. Though not shown in the figure, an insulating material such as a bag-like body made of synthetic resin that houses the electrode assembly 1 and the pair of current collectors 2 and 3 is provided between the battery case 4, and the electrode assembly 1 and the pair of current collectors 2 and 3.

Figure 4:
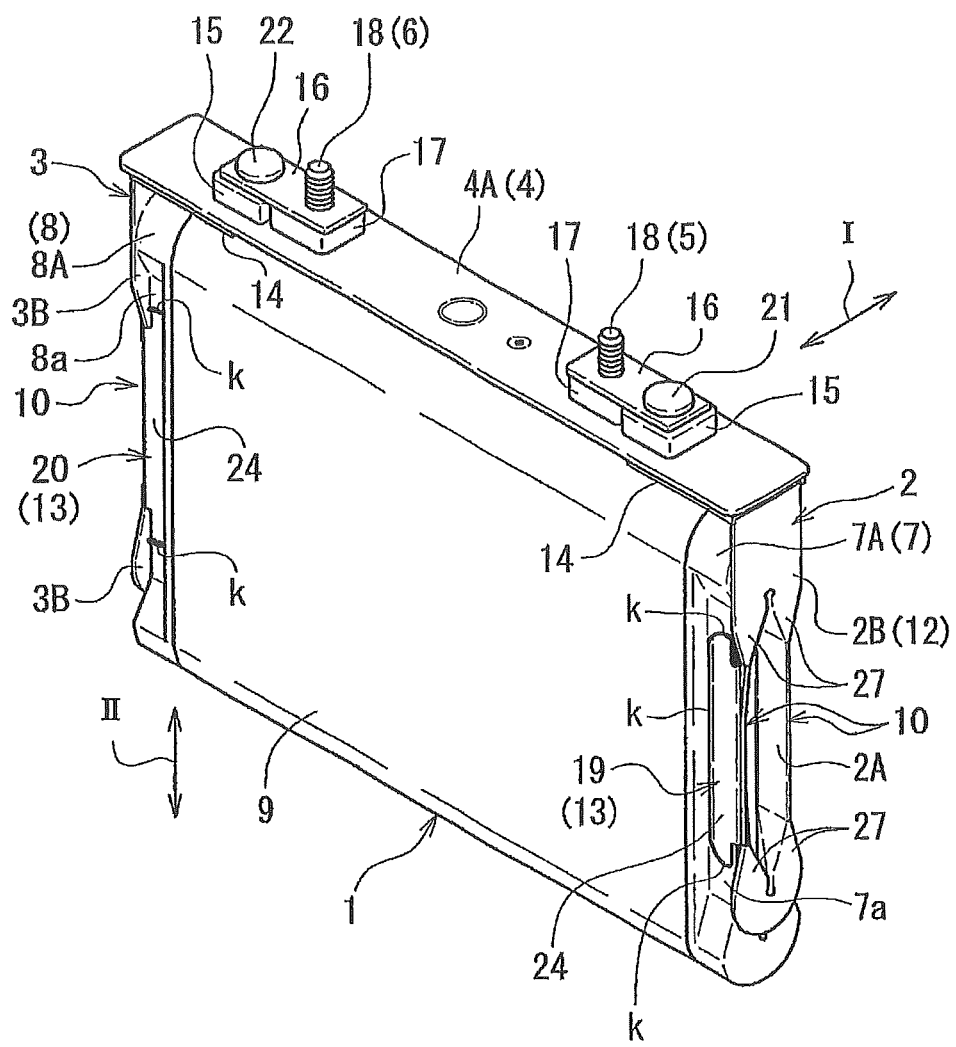
FIG. 4 is a perspective view showing a structure inside a battery case.
Figure 5:
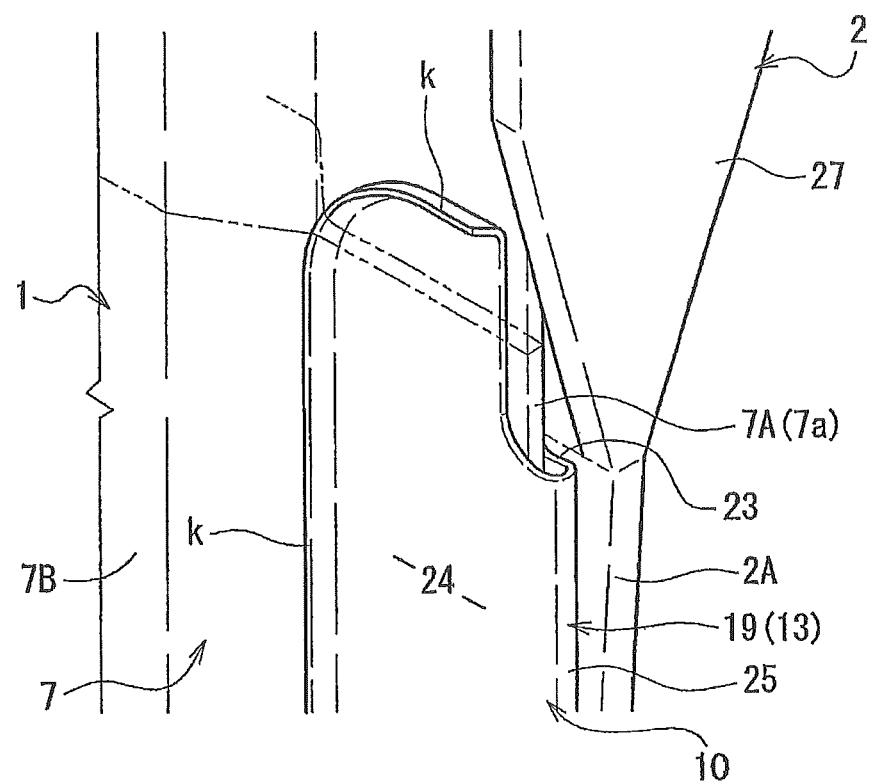
FIG. 5 is a perspective view showing a main part of a coupling part having end parts in the form of a clip.

As shown in FIG. 2, FIG. 5, and FIG. 4, the electrode assembly 1 is formed by winding positive and negative electrode plates (electrode foils) 7 and 8 with two separators 9 that are insulating materials provided between these two plates 7 and 8 into a spiral shape, so as to have a rounded rectangular shape as viewed in a direction of a spiral axis P. The positive electrode plate 7 has a structure in which a positive electrode active material layer is formed on a strip-shaped substrate made of aluminum foil, and has positive electrode active material layer non-formed parts 7A, formed along one end part in the longitudinal direction (in the left-right direction), where no positive electrode active material layer is formed. Thus, the positive electrode plate 7 includes a positive electrode active material layer formed part 7B that forms the main body of the electrode assembly 1, and the positive electrode active material layer non-formed parts 7A located on one end side of the electrode assembly 1 in the direction of the spiral axis P. The negative electrode plate 8 has a structure in which a negative electrode active material layer is formed on a strip-shaped substrate made of copper foil, and has negative electrode active material layer non-formed parts 8A, formed along one end part in the longitudinal direction (in the left-right direction), where no negative electrode active material layer is formed. Thus, the negative electrode plate 8 includes a negative electrode active material layer formed part 8B that forms the main body of the electrode assembly 1, and the negative electrode active material layer non-formed parts 8A located on the other end side of the electrode assembly 1 in the direction of the spiral axis P. In the electrode assembly 1 having a four-layer structure, the positive electrode plate 7 and the negative electrode plate 8 are alternately layered while being shifted toward different directions from each other in the direction of the axis P.

The active material layer non-formed parts 7A and 8A where the aluminum foil and the copper foil are exposed are formed along the respective ends of the positive and negative electrode plates 7 and 8 that are opposite to each other in the direction of the spiral axis P, as active material non-coated parts. While a large number of linear portions 7a and 8a (which vertically extend in FIG. 1) of the active material layer non-formed parts 7A and 8A which are aligned from inside to outside in the radial direction of the spiral axis P are bundled and layered, they are coupled with counter electrode plate parts 2A and 3A of the current collectors 2 and 3. For ease of understanding the drawings, the spacing between the positive and negative electrode plates 7 and 8 and the separators 9 is enlarged (FIG. 2) and significantly enlarged (FIG. 4) in FIGS. 2 and 4.

The electrode assembly 1 of the electric storage device A according to Embodiment 1 is formed to have a reduced thickness in the front-rear direction (in the direction of the arrow I) that is a first direction orthogonal to the direction of the spiral axis P, and to have a flattened rounded cuboid shape elongated in the up-down direction (in the direction of the arrow II) that is a second direction orthogonal to both the direction of the spiral axis P and the front-rear direction. Further, the linear portions 7a and 8a extending along the up-down direction (in the direction of the arrow II) are selected as the plurality of active material layer non-formed parts 7A and 8A.

As a positive electrode active material, known materials capable of absorbing and releasing lithium ions can be used. For example, $LiCoO_2$, a lithium-containing transition metal oxide having an $\alpha$-$NaFeO_2$ structure in which a part of the Co is substituted by another transition metal such as Ni and Mn or boron, a compound having a spinel crystal structure typified by $LiMn_2O_4$, $LiFePO_4$, $LiFeSO_4$, or a polyanionic compound in which a part of the Fe is substituted by Co, Mn, or the like, can be used.

Figure 3:
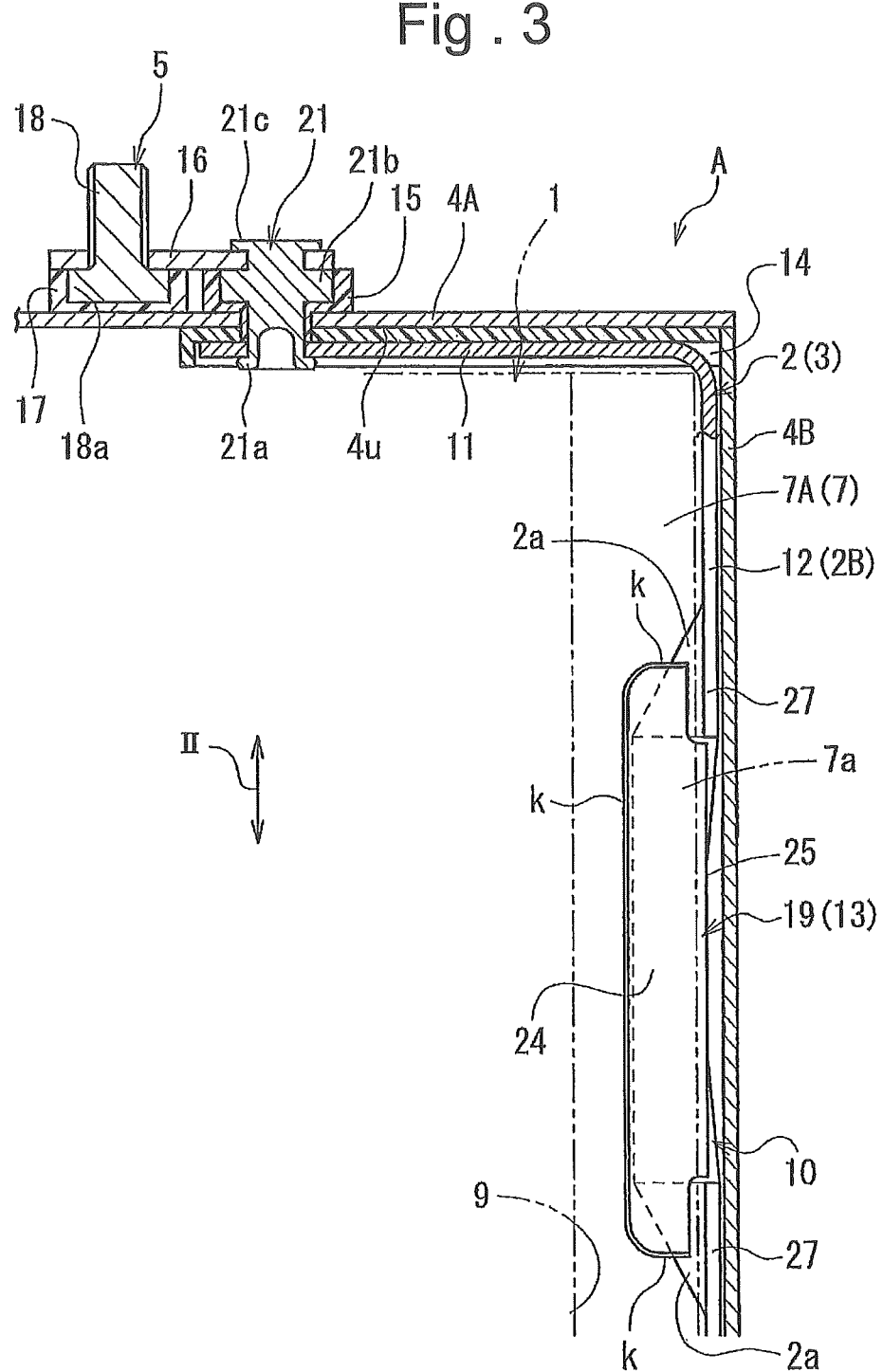
FIG. 3 is a partially cutout front view showing a structure of a coupling part according to Embodiment 1.

The positive electrode current collector 2 made of aluminum or aluminum alloy and the negative electrode current collector 3 made of copper or copper alloy have the same structure as each other. Therefore, the current collector 2 on one side is described herein. That is, as shown in FIG. 2 and FIG. 3, the current collector 2 is a substantially L-shaped part in front view, which includes a horizontal upper part 11 engaged onto the top plate 4A and a vertical current collecting part 12 bent at the end of the horizontal upper part 11 and hung therefrom. The horizontal upper part 11 is connected to an external terminal 5 via a rivet 21 made of a metal material inserted through a hole (not numbered) formed in its inner end part. The vertical current collecting part 12 is connected to the positive electrode plate 7 via a pair of counter electrode plate parts 2A that are formed in parallel to each other in its vertically intermediate part. The upper and lower portions of the counter electrode plate parts 2A are referred to as main plate parts 2B.

The pair of counter electrode plate parts 2A are formed with an appropriate spacing therebetween in the thickness direction of the electrode assembly 1 (in the direction of the arrow I) while projecting perpendicularly inwardly (in the direction of the spiral axis P) from the vertical current collecting part 12. On both sides (upper and lower sides) of each of the counter electrode plate parts 2A in the form of a plate extending along the spiral axis P, reinforcement plate parts 2a bending at an appropriate angle are formed. Further, triangle plate parts 27 integrally provided with the reinforcement plate parts 2a are formed on both sides of each of the counter electrode plate parts 2A so as to be aligned in the front-rear direction (in the direction of the arrow I) via a hole 28.

The positive and negative external terminals 5 and 6 have the same structure as each other. Therefore, the external terminal 5 on one side is described herein. The horizontal upper part 11 has a surface abutted against a lower surface 4u of the top plate 4A via the first insulating member 14 made of synthetic resin that opens downwardly. The rivet 21 externally surrounded by a second insulating member 15 made of synthetic resin has a cylindrical lower part 21a that is inserted through a circular hole (not numbered) of the top plate 4A and a circular hole (not numbered) of the first insulating member 14. The lower end part of the cylindrical lower part 21a is crimped and flattened, thereby allowing the rivet 21 to be connected to the horizontal upper part 11. That is, the horizontal upper part 11 is fixed to the top plate 4A by the cylindrical lower part 21a of the rivet 21 in an insulated state from the top plate 4A by the second insulating member 15 and the first insulating member 14, which serve also as insulation gaskets. It should be noted that the positive electrode rivet 21 is made of aluminum, and a negative electrode rivet 22 is made of copper.

A cylindrical upper part 21c is formed on the upper side of a rectangular body part 21b of the rivet 21. The upper end part of the cylindrical upper part 21c is crimped and flattened, thereby allowing a conductive plate 16 made of a metal plate that is passed through the cylindrical upper part 21c to be fixed to the rivet 21. An electrode bolt 18 is engaged into a circular hole (not numbered) formed in the conductive plate 16. A square base part 18a of the electrode bolt 18 is accommodated within a third insulating member 17 made of synthetic resin and having a bottomed open-top shape. That is, the electrode bolt 18 is supported by the conductive plate 16 fixed to the cylindrical upper part 21c.

Next, coupling parts 10 provided respectively between the electrode plates 7 and 8 and the current collectors 2 and 3 are described. The current collecting structure of one of the coupling parts 10 is described, mainly referring to the current collector 2 on one side. As shown in FIG. 1 to FIG. 6, the electrode plate and the current collector 2 are coupled with each other by ultrasonic welding that is an example of pressure welding, in the state where a large number of active material layer non-formed parts 7A are layered and interposed between a clip 19 made of a metal plate material and the counter electrode plate part 2A. The positive electrode clip 19 is made of aluminum, and a negative electrode clip 20 is made of copper. However, their size and shape are the same as each other.

Figure 6:
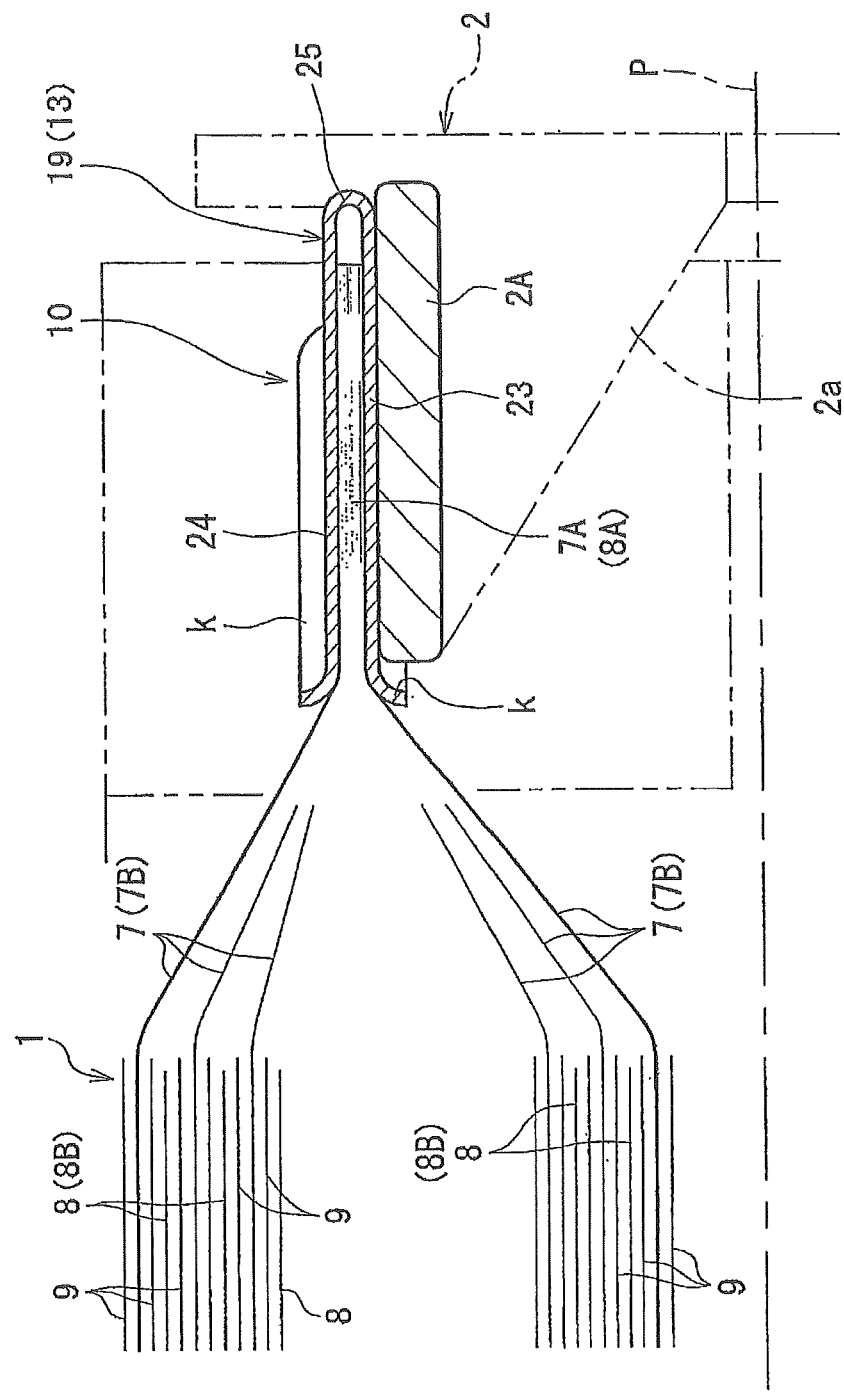
FIG. 6 is a sectional view showing a structure of a coupling part in plan view.
Figure 7:
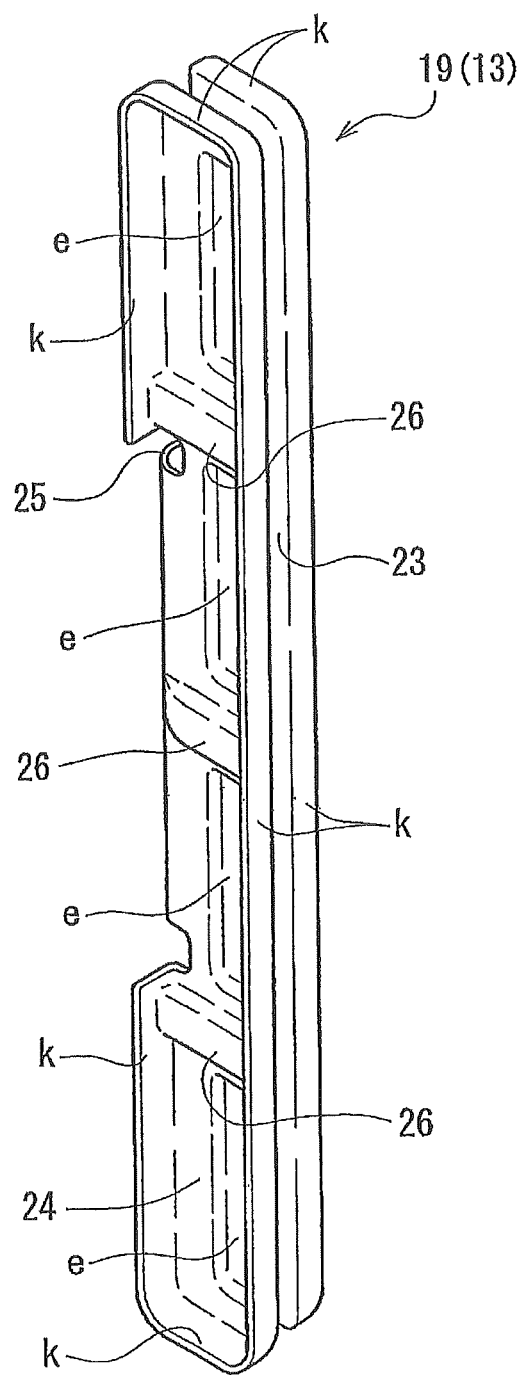
FIG. 7 is a perspective view showing a clip according to Embodiment 2.
Figure 8A:
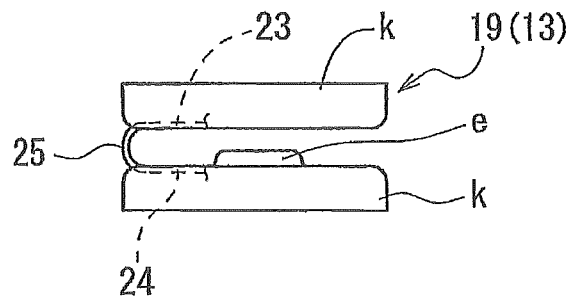
FIG. 8A is a plan view of the clip shown in FIG. 7.
Figure 8B:
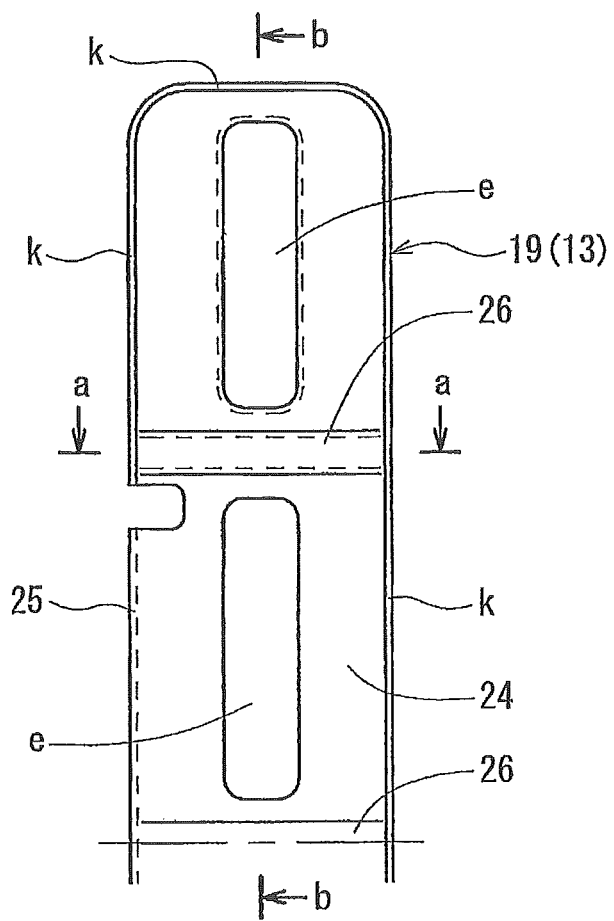
FIG. 8B is a front view of the clip shown in FIG. 7.
Figure 9A:
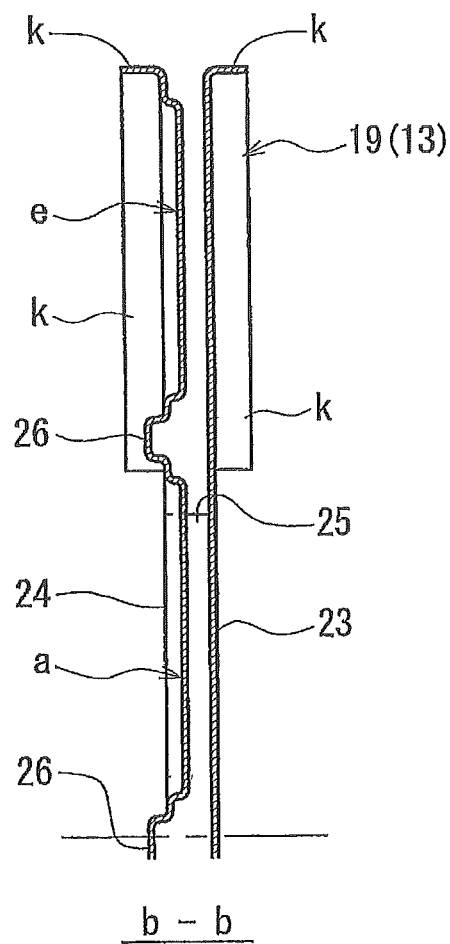
FIG. 9A is a sectional view taken along the line b-b in FIG. 8B.
Figure 9B:
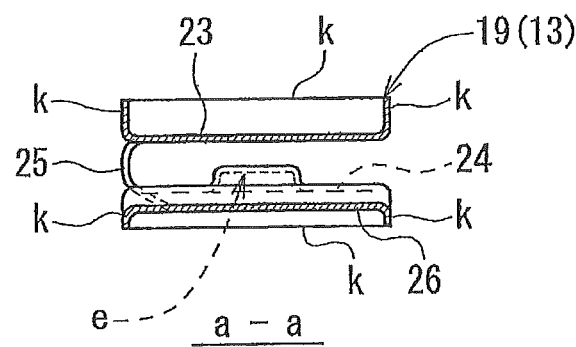
FIG. 9B is a sectional view taken along the line a-a in FIG. 8B.

First, a structure of a metal material 13 is described, referring to the positive electrode clip 19. As shown in FIG. 4 to FIG. 6, the clip 19 used in this Embodiment 1 is a bifurcated clip including a narrow plate part 23 provided between the counter electrode plate part 2A (the current collector 2) and the active material layer non-formed parts 7A, an external plate part 24 sandwiching the plurality of active material layer non-formed parts 7A with the narrow plate part 23, and a semiarcuate connecting plate part 25 connecting the narrow plate part 23 and the external plate part 24 to each other. The narrow plate part 23 and the external plate part 24 have a substantially square (rectangular) shape, as viewed in the front-rear direction (as viewed in the direction of the arrow I). The narrow plate part 23 and the external plate part 24 each have a curled part k in which their edge is curved in a direction away from the active material layer non-formed parts 7A.

Such curled parts k are formed at three portions, along the edge on the center side (the active material layer formed part side) of the electrode assembly 1 in the direction of the spiral axis P and the edges on both sides thereof, that is, the edges on the upper side (one end side of the linear portions 7a of the active material layer non-formed parts 7A) and on the lower side (the other end side of the linear portions 7a of the active material layer non-formed parts 7A), in each of the narrow plate part 23 and the external plate part 24. The curled part k on the center side of the electrode assembly 1 in the direction of the spiral axis P is connected to the curled parts k on both sides in a direction orthogonal to the direction of the spiral axis P by a smooth curved line such as a circular arc. In short, the curled parts k are the portions in which the edges of the narrow plate part 23 and the external plate part 24 are curved so as to have a cross section in a curved shape such as a quarter-cylindrical surface.

Meanwhile, the coupling part 10 is formed by ultrasonic welding in the state where the large number of active material layer non-formed parts 7A are sandwiched between the narrow plate part 23 and the external plate part 24, and the narrow plate part 23 and the counter electrode plate part 2A are abutted against each other. For example, the ultrasonic welding is performed such that a tip (not shown) is pressed against the external plate part 24 in the state where an anvil (not shown) is abutted against an outer surface of the counter electrode plate part 2A that is a surface on the opposite side to the narrow plate part 23.

Embodiment 2

Figure 10:
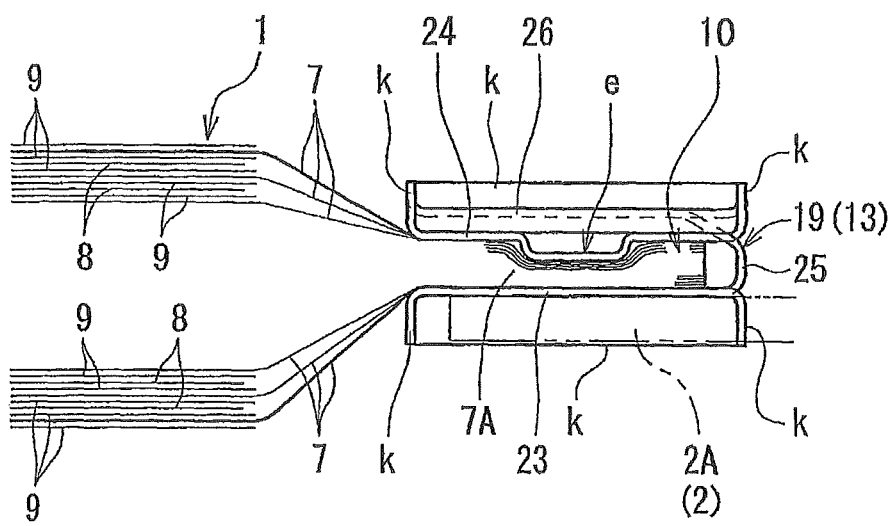
FIG. 10 is a sectional view of a coupling part using the clip shown in FIG. 7.

The electric storage device A according to Embodiment 2 uses, as the metal material 13, the clips 19 and 20 in which portions e to be subjected to ultrasonic welding that is an example of pressure welding are shifted closer (offset and displaced) to the active material layer non-formed parts 7A and 8A side than their peripheries, as shown in FIG. 10. The electric storage device A according to Embodiment 2 is the same as the electric storage device A according to Embodiment 1 except that the clips 19 and 20 are different.

As shown in FIG. 7 to FIG. 10, the clip 19 according to Embodiment 2 is a bifurcated clip including the narrow plate part 23, the external plate part 24, and the connecting plate part 25. In each of the plate parts 23 and 24, the curled parts k are formed along the edge on the center side of the electrode assembly 1 in the direction of the spiral axis P, the edges on both sides in a direction orthogonal to the direction of the spiral axis P (that is, the edges on the upper and lower sides), and the edge on the opposite side of the center of the electrode assembly 1 in the direction of the spiral axis P (that is, the end side of the electrode assembly 1 in the direction of the spiral axis P) in substantially one-fourth portions on the upper and lower sides. The portions e to be subjected to ultrasonic welding are formed as four recesses e aligned in the longitudinal direction of the clip in the external plate part 24.

Each of the recesses e serves as a portion against which the tip abuts in ultrasonic welding, and has a rectangular shape elongated in the up-down direction that is the longitudinal direction of the clip. Projecting ridges 26 extending in the left-right direction are formed in three portions each located between adjacent recesses e. Two of the projecting ridges 26 at the top and the bottom are provided to connect the curled parts k on the left and right sides. In the portions of the recesses e, the large number of active material layer non-formed parts 7A are connected to the counter electrode plate part 3A while being compressed further (see FIG. 10). In the clips 19 and 20 according to Embodiment 2, the mechanical strength and rigidity of the external plate part 24 are improved due to the presence of the recesses e and the projecting ridges 26.

Embodiment 3

Figure 11:
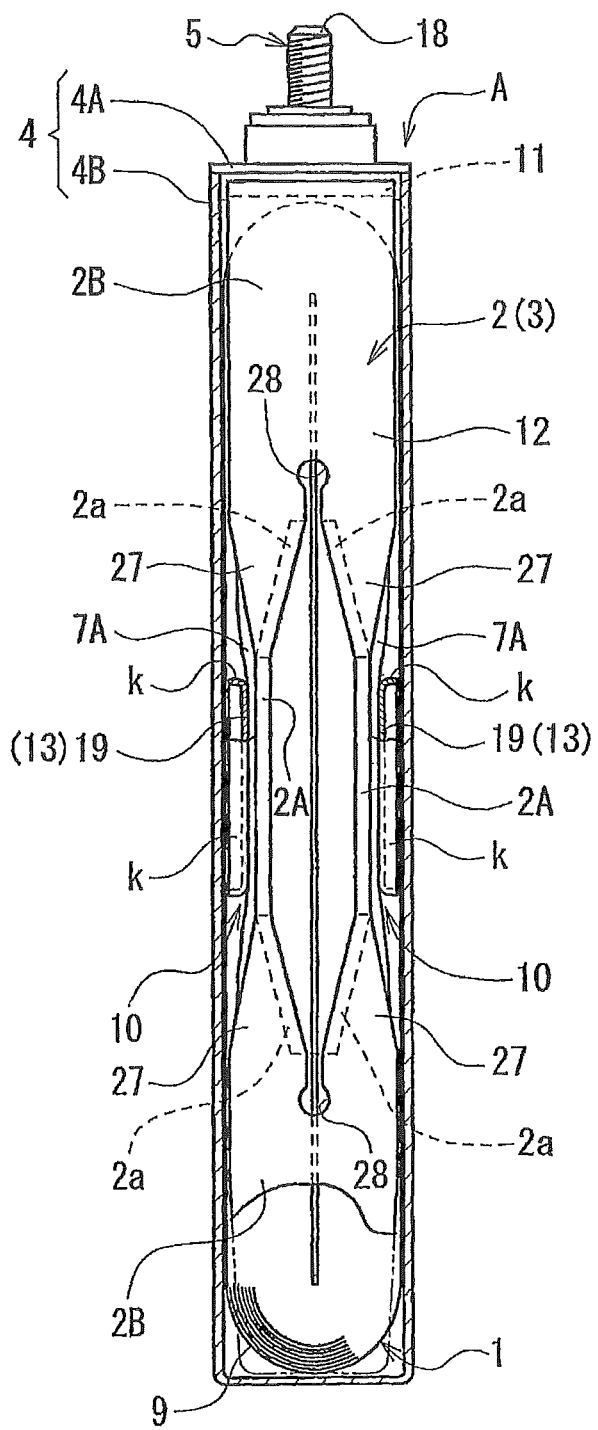
FIG. 11 is a side view showing a main part of a clip and a coupling part according to Embodiment 3.
Figure 12:
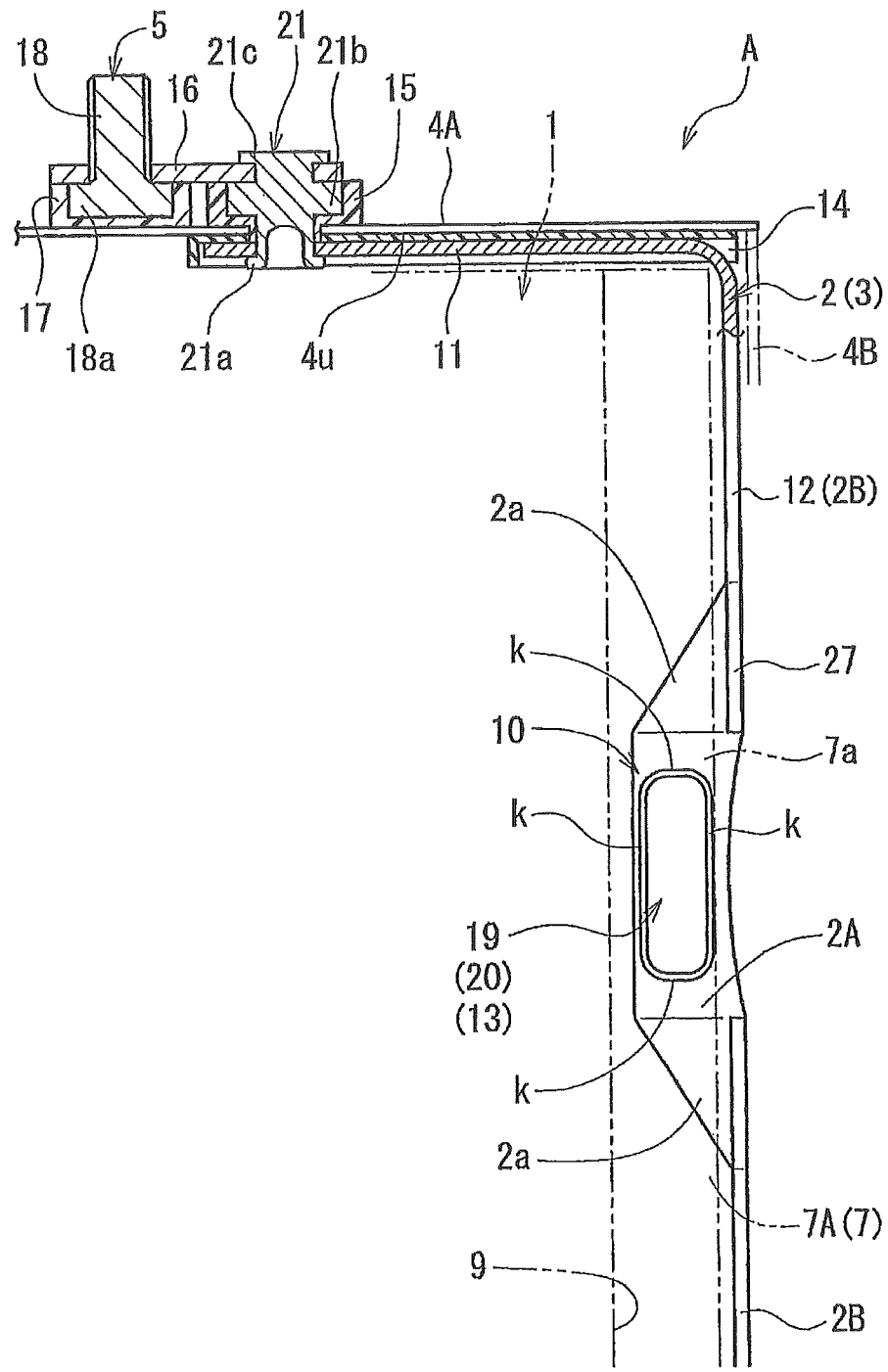
FIG. 12 is a front view showing a coupling part shown in FIG. 11.

The electric storage device A according to Embodiment 3 uses, as the metal material 13, the clips 19 and 20 each in the form of one piece of a plate provided with the curled part k that extends over the entire outer circumference, as shown in FIGS. 11 and 12. The electric storage device A according to Embodiment 3 is the same as the electric storage device A according to Embodiment 1 except that the clips 19 and 20 are different. The coupling part 10 according to Embodiment 3 is formed by ultrasonic welding in the state where the large number of active material layer non-formed parts 7A are provided between the clip 19 and the counter electrode plate part 2A. In this embodiment, since the curled part k is provided over the entire outer circumference of each of the clips 19 and 20, the foil breakage and tear of the active material layer non-formed parts are avoided over the entire circumference of the clips.

The electric storage device A according to each embodiment is as described above. In conventional electric storage devices, clips are in the form of flat plates, and have sharp end edges being press-cut surfaces which are simply cut. Therefore, in the case where a vibration is applied thereto from the outside, the active material layer non-formed parts 7A and 8A are rubbed by the edge parts, which may result in breakage or tear. Further, the clips have poor mechanical strength due to their flat plate shape, and thus there have been cases where the clips cannot support the active material layer non-formed parts 7A and 8A sufficiently against the vibration applied from the outside. As a result, the active material layer non-formed parts 7A and 8A cannot follow the motion of the vibrating current collectors, which may result in breakage or tear due to an increase in bending degree at the clipped portions. The occurrence of breakage or tear in the electrode plates 7 and 8 leads to a reduction in the current collecting function, which may possibly cause inconvenience such as an increase in the internal resistance of the battery cell.

In the coupling parts 10 of the electric storage device A according to each embodiment described above, the clips 19 and 20 sandwiching the large number of active material layer non-formed parts 7A and 8A include the curled parts k in which the edges of the narrow plate part 23 and the external plate part 24 are curved in a direction away from the active material layer non-formed parts. Therefore, the active material layer non-formed parts 7A and 8A are abutted against the curved surfaces, not the edges, of the clips 19 and 20. Thus, even when the active material layer non-formed parts 7A and 8A are rubbed with the clips 19 and 20 due to vibration applied from the outside, the occurrence of breakage or tear in the active material layer non-formed parts 7A and 8A is avoided.

The clips 19 and 20 may possibly cause edge abrasion with the electrode plates 7 and 8 along the edges on three sides in directions, as seen from the coupling portion with the current collectors 2 and 3, in which the electrode plates 7 and 8 exist, that is, the edge on the center side of the electrode assembly 1 in the direction of the spiral axis P and the edges on both sides thereof. Therefore, the curled parts k are formed in the clips 19 and 20 along the edge on the center side of the electrode assembly 1 in the direction of the spiral axis P and the edges on both sides thereof. That is, the curled parts k are provided only in portions that rub the electrode plates 7 and 8. Therefore, in the case where vibration is applied during an on-board state on a traveling vehicle, the clips 19 and 20 rub the electrode plates 7 and 8 in the state where their curled parts k that are curved surfaces are abutted against the electrode plates 7 and 8. Thus, it is possible to provide a more rational electric storage device capable of exerting the aforementioned functional effect of avoiding the occurrence of breakage or tear in the active material layer non-formed parts 7A and 8A by using the curled parts k that are the minimum necessary.

Further, the edge on the center side of the electrode assembly 1 in the direction of the spiral axis P is connected to the edges on both sides thereof so as to form an arcuate shape, and the curled parts k are formed continuously over the edge on the center side of the electrode assembly 1 in the direction of the spiral axis P and the edges on both sides thereof. Therefore, in the clips 19 and 20, even in the case where the edge abrasion with the electrode plates 7 and 8 occurs along the edge on the center side of the electrode assembly 1 in the direction of the spiral axis P and the edges on both sides thereof, the occurrence of breakage or tear in the active material layer non-formed parts 7A and 8A is avoided.

Further, in the electric storage device A according to Embodiment 2, the active material layer non-formed parts 7A and 8A, the counter electrode plate parts 2A and 3A, and the clips 19 and 20 are respectively integrally coupled by pressure welding, and the portions of the clips 19 and 20 to which a pressure is applied by the tip are shifted closer (offset and displaced) to the active material layer non-formed parts 7A and 8A side than the peripheries thereof. Therefore, the following functional effects also can be obtained.

The clips 19 and 20 themselves are thin plates, and thus the welded parts can be formed into recessed shapes. Therefore, the clips 19 and 20 can extend along the electrode plates 7 and 8. That is, the active material layer non-formed parts 7A and 8A are usually in a thin, soft, and wavy state, a widely undulating state, or the like. Therefore, the thickness of a large number of them that are merely layered and bundled is obviously larger than the dimension obtained by multiplying the thickness of one piece of the electrode plates 7 and 8 by the number of stacked layers. Accordingly, when the large number of layered active material layer non-formed parts 7A and 8A are pressed strongly in the thickness direction, a reduction in the overall thickness occurs. Therefore, when ultrasonic welding is performed, the welded parts are pressed in the state where the tip is pressed against the anvil side, thereby allowing welding to be performed by applying ultrasonic vibration while the large number of active material layer non-formed parts 7A and 8A are compressed together with the clips 19 and 20 so as to be recessed.

In this case, the clips 19 and 20 according to Embodiment 2 have been already recessed before the application of a pressure due to the presence of the recesses e. Therefore, the pressure load to be applied thereto can be used for compressing the active material layer non-formed parts 7A and 8A. This allows the clips to extend along the electrode plates 7 and 8 more closely.

In addition, in the electric storage device A according to Embodiment 2, the clips 19 and 20 include projecting ridges 26 elongated in one direction and projecting in a direction away from the active material layer non-formed parts. Therefore, the clips 19 and 20 have a ribbed shape, so that the mechanical strength and rigidity of the clips 19 and 20 are improved. This allows the clips 19 and 20 to function as frames that support the active material layer non-formed parts 7A and 8A.

The gathered portions of the active material layer non-formed parts 7A and 8A to be conducted with the current collectors 2 and 3 are portions with the lowest mechanical strength as the electrode plates 7 and 8. However, the clips 19 and 20 are allowed to extend along the electrode plates 7 and 8 and function as frames that support the active material layer non-formed parts 7A and 8A, thereby enabling the active material layer non-formed parts 7A and 8A to follow the motion of the current collectors 2 and 3 caused due to vibration. This can suppress or eliminate the generation of folds or wrinkles in the gathered portion that is disadvantageous in strength, and also can make breakage or tear of the active material layer non-formed parts 7A and 8A less likely to occur due to folds or wrinkles.

Specifically, in the electric storage device A according to Embodiment 2, the curled parts k are formed along the edge on the center side of the electrode assembly 1 in the direction of the spiral axis P and the edge on the opposite side thereof in the clips 19 and 20, and the projecting ridges 26 connect the curled part k on the center side of the electrode assembly 1 in the direction of the spiral axis P and the curled part k on the opposite side thereof to each other, thereby achieving the aforementioned effects.

Further, in the electric storage device A according to Embodiment 2, the aforementioned effects are achieved by the following. A plurality of projecting ridges 26 are aligned at intervals from each other; the active material layer non-formed parts 7A and 8A, the counter electrode plate parts 2A and 3A, and the clips 19 and 20 are respectively integrally coupled by pressure welding; partial regions of the clips 19 and 20 defined by the projecting ridges 26 serve as the recesses e to which a pressure is applied; and the recesses e are displaced toward the center side of the electrode assembly 1 in the direction of the spiral axis P from their peripheries.

The clips 19 and 20 each have a bifurcated shape including the narrow plate part 23 provided between the active material layer non-formed parts 7A and 8A and the counter electrode plate parts 2A and 3A, and the external plate part 24 sandwiching the active material layer non-formed parts 7A and 8A with the narrow plate part 23. Thus, it is possible to provide an electric storage device that is widely applicable, for example, to large secondary battery cells.

Further, in the electric storage device A according to Embodiment 2, the clips 19 and 20 include the connecting plate part 25 connecting the narrow plate part 23 and the external plate part 24 to each other, and the curled parts k are formed over the entire outer circumference or substantially the entire circumference except the portion connected to the connecting plate part 25, in each of the narrow plate part 23 and the external plate part 24. Therefore, the coupling parts 10 are formed by ultrasonic welding in the state where a large number of active material layer non-formed parts 7A and 8A are provided between the clips 19 and 20 and the counter electrode plate parts 2A and 3A.

REFERENCE SIGNS LIST

1: Electrode assembly
2: Positive current collector
3: Negative current collector
7: Positive electrode plate
7A: Active material layer non-formed part
7B: Active material layer formed part
8: Negative electrode plate
8A: Active material layer non-formed part
8B: Active material layer formed part
9: Separator
13: Metal material
23: Narrow plate part
24: External plate part
e: Portion to which pressure is applied
k: Curled part

The invention claimed is:

1. An electric storage device, comprising:
an electrode assembly including positive and negative electrode plates that are insulated from each other, at least one of the electrode plates including an active material layer formed part and an active material layer non-formed part;
positive and negative current collectors; and
a metal material including an inner surface that is abutted against the active material layer non-formed part,
wherein the metal material comprises an extended portion, extending away from the active material layer non-formed part, in which an edge of the metal material is curved in a direction away from the active material layer non-formed part, the extended portion protruding from a periphery of outer surfaces of the metal material, each of the outer surfaces of the metal material facing away from the inner surface of the metal material,
wherein the active material layer non-formed part, each of the current collectors, and the metal material are integrally coupled,
wherein the extended portion includes a first extended portion and a second extended portion, the first extended portion being formed along an edge on an active material layer formed part side of the metal material and extending in a first direction, and the second extended portion being formed along an edge in the first direction of the metal material and extending in a second direction substantially perpendicular to the first direction,
wherein the metal material comprises a projecting ridge elongated in one direction and projecting in the direction away from the active material layer non-formed part
wherein the extended portion is formed along the edge on the active material layer formed part side of the metal material and an edge on an opposite side thereof, and
wherein the projecting ridge connects the extended portion on the active material layer formed part side and the extended portion on the opposite side.

2. The electric storage device according to claim 1, wherein the edge on the active material layer formed part side is connected to the side edges of the outer surfaces of the metal material so as to form an arcuate shape, and
wherein the extended portion is formed continuously over the edge on the active material layer formed part side and the side edges of the outer surfaces of the metal material.

3. The electric storage device according to claim 1, wherein the active material layer non-formed part, said each of the current collectors, and the metal material are integrally coupled by pressure welding, and
wherein a portion of the metal material to which a pressure is applied is displaced toward the active material layer non-formed part side from its periphery.

4. The electric storage device according to claim 1, wherein a plurality of the projecting ridges are aligned at intervals from each other,
wherein the active material layer non-formed part, said each of the current collectors, and the metal material are integrally coupled by pressure welding, and
wherein a partial region of the metal material that is defined by the projecting ridges includes a portion to which a pressure is applied, the portion being displaced toward the active material layer non-formed part side from its periphery.

5. The electric storage device according to claim 1, wherein the metal material has a bifurcated shape including a narrow plate part provided between the active material layer non-formed part and each of the current collectors, and an external plate part sandwiching the active material layer non-formed part with the narrow plate part.

6. The electric storage device according to claim 5, wherein the metal material includes a connecting plate part connecting the narrow plate part to the external plate part, and
wherein the extended portion is formed over an entire outer circumference or substantially the entire circumference except a portion connected to the connecting plate part, in each of the narrow plate part and the external plate part.

7. The electric storage device according to claim 1, wherein the active material layer non-formed part comprises a plurality of active material layer non-formed parts stacked with each other to form a stack of the plurality of active material layer non-formed parts, the stack including a first surface and a second surface being opposite to the first surface, and wherein the metal material comprises a first plate part disposed adjacently to the first surface of the stack, a second plate part disposed adjacently to the second surface of the stack, and a connecting plate part connecting the first plate part and the second plate part.

8. The electric storage device according to claim 7, wherein the first plate part comprises a flat plate elongated in an extending direction orthogonal to a stacked direction of the plurality of active material layer non-formed parts, and
wherein a length of the first plate is longer than a length of the connecting plate part in the extending direction.

9. The electric storage device according to claim 1, wherein the active material layer non-formed part comprises a plurality of active material layer non-formed parts stacked with each other to form a stack of the plurality of active material layer non-formed parts, the stack including a first surface and a second surface being opposite to the first surface,
wherein the metal material comprises a first plate part disposed adjacently to the first surface of the stack, and
wherein the first plate part comprises a projecting portion projecting toward the first surface of the stack from a periphery of the projecting portion.

10. The electric storage device according to claim 9, wherein the projecting portion and the periphery of the projecting portion are in contact with the first surface of the stack.

11. The electric storage device according to claim 9, wherein the projecting portion comprises a plurality of projecting portions, and
wherein the first plate part comprises a ridge projecting away from the first surface of the stack between the plurality of the projecting portions.

12. The electric storage device according to claim 11, wherein the first extended portion is connected to an edge of the ridge of the first plate part, and the second extended portion is connected to another edge of the ridge of the first plate part.

13. The electric storage device according to claim 12, wherein the extended portion further comprises a third extended portion connecting the first extended portion and the second extended portion.

14. An electric storage device, comprising:
an electrode assembly including positive and negative electrode plates that are insulated from each other, at least one of the electrode plates including an active material layer formed part and an active material layer non-formed part;
positive and negative current collectors; and
a metal material including an inner surface that is abutted against the active material layer non-formed part,
wherein the metal material comprises a first plate part stacked on the active material layer non-formed part,
wherein the first plate part has a substantially rectangular shape as viewed in a stacked direction, the first plate part comprising at least one rounded corner,
wherein the first plate part comprises an extended portion, extending away from the active material layer non-formed part, and protruding from a periphery of outer surfaces of the metal material, each of the outer surfaces of the metal material facing away from the inner surface of the metal material,
wherein the extended portion includes a first extended portion and a second extended portion, the first extended portion being formed along an edge on an active material layer formed part side of the metal material and the second extended portion extending substantially perpendicular to a direction in which the first extended portion extends,
wherein the metal material includes a plurality of metal materials arranged in a first direction,
wherein the current collector includes a plate part arranged between the plurality of metal materials in the first direction,
wherein the metal material comprises a projecting ridge elongated in one direction and projecting in a direction away from the active material layer non-formed part,
wherein the extended portion is formed along the edge on the active material layer formed part side of the metal material and an edge on an opposite side thereof, and
wherein the projecting ridge connects the extended portion on the active material layer formed part side and the extended portion on the opposite side.

15. The electric storage device according to claim 14, wherein, in the extended portion, an edge of the first extended portion is curved in the direction away from the active material layer non-formed part.

16. The electric storage device according to claim 1, wherein, in a cross-sectional view that shows the active material layer non-formed part protrudes from the active material layer non-formed part, the current collector overlaps with the extended portion of the metal material.

17. The electric storage device according to claim 1, wherein the metal material includes a plurality of metal materials arranged in a third direction, and
wherein the current collector includes a plate part arranged between the plurality of metal materials in the third direction.

18. An electric storage device, comprising:
an electrode assembly including positive and negative electrode plates that are insulated from each other, at least one of the electrode plates including an active material layer formed part and an active material layer non-formed part;
positive and negative current collectors; and
a metal material including an inner surface that is abutted against the active material layer non-formed part,
wherein the metal material comprises an extended portion, extending away from the active material layer non-formed part, in which an edge of the metal material is curved in a direction away from the active material layer non-formed part, the extended portion protruding from a periphery of outer surfaces of the metal material, each of the outer surfaces of the metal material facing away from the inner surface of the metal material,
wherein the active material layer non-formed part, each of the current collectors, and the metal material are integrally coupled,
wherein the extended portion includes a first extended portion and a second extended portion, the first extended portion being formed along an edge on an active material layer formed part side of the metal material and the second extended portion extending substantially perpendicular to a direction in which the first extended portion extends,
wherein the metal material includes a projection, which projects toward the active material layer non-formed part, on the inner surface,
wherein the metal material comprises a projecting ridge elongated in one direction and projecting in the direction away from the active material layer non-formed part, wherein the extended portion is formed along the edge on the active material layer formed part side of the metal material and an edge on an opposite side thereof, and wherein the projection ridge connects the extended portion on the active material layer formed part side and the extended portion on the opposite side.

* * * * *